United States Patent Office 2,854,358

Patented Sept. 30, 1958

2,854,358

TREATMENT OF SEMICONDUCTOR BODIES

Bertram Schwartz, Los Angeles, Calif., assignor to Hughes Aircraft Company, Culver City, Calif., a corporation of Delaware No Drawing. Application September 4, 1956
Serial No. 607,545

10 Claims. (Cl. 117—200)

This invention relates to the fabrication of semiconductor signal translating devices and, more particularly, to a method of treating the surface of semiconductor crystal bodies to improve the electrical characteristics thereof, and to such improved devices.

For definitions of the terms "N-type" or "P-type" semiconductor, and "P–N junction," reference may be had to Patent No. 2,708,646 issued to Harper Q. North, May 17, 1955, entitled "Methods of Making Germanium Alloy Semiconductors."

As is now well known to the art, germanium and silicon crystal bodies are used in semiconductor translating devices, such as rectifiers, transistors, and photocells. It is also well known to the art that the electrical characteristics of the semiconductor devices are adversely affected by the presence of contaminants on the surface of the semiconductor crystal body. Various means have been utilized heretofore to protect the crystal from these contaminants which may deposit upon exposure of the semiconductor body to the ambient conditions such as atmosphere and temperature, or by other causes. One prior method of protecting the surface of the semiconductor body is by coating the surface of the body with silicone varnish or like material and baking the body at an elevated temperature for an extended period of time. For example, the common procedure after application of the silicone varnish is to bake the crystal body for a period of four hours at a temperature of 300° C. This method has several limitations and disadvantages in production processes, however, and such an extended baking period does not lend itself to mass production techniques.

To obviate the above-mentioned problems, a new method was devised for treating semiconductor bodies in order to improve the protective coating on, and the electrical characteristics of the body. This method was disclosed and claimed in patent application Serial No. 529,351, filed August 18, 1955, entitled "Method of Treating Semiconductor Bodies for Translating Devices," by Bertram Schwartz, and assigned to the assignee of this application. As therein disclosed, a semiconductor body was treated by first etching it by methods well known to the art. After etching, the body was treated with a hydrolyzable, polymerizable organo-substituted silane solution, such as a 1—1 mixture of dimethyldichlorosilane and methyltrichlorosilane.

While this surface treatment greatly enhances the electrical characteristics of the semiconductor bodies and works extremely well under essentially all conditions, it has been found that in some cases, particularly with respect to transistors, there is some degrading of electrical characteristics over relatively long periods of time. Although it is not thoroughly understood at present, this was thought to result from the fact that the protective coating placed upon the semiconductor body became somewhat unstable over long periods of time because of the uncontrolled length of the polymer chains and, in some cases, undetermined reaction of polymer ends when it was utilized upon semiconductor bodies having irregular shapes.

Accordingly, it is an object of the present invention to provide a method of surface treatment for semiconductor crystal bodies which results in improved electrical characteristics of semiconductor devices utilizing the semiconductor bodies and to provide such improved semiconductor devices.

Another object of the present invention is to provide a method of treating the surfaces of a semiconductor body to provide a controlled stable protective film thereon irrespective of body shapes.

It is a further object of the present invention to provide a method of surface treatment of semiconductor bodies which is less time-consuming than methods heretofore known to the art and which lends itself readily to mass production.

A still further object of the present invention is to provide an improved method of surface treatment of semiconductor crystal bodies which results in clearly-defined P–N junctions in junction-type semiconductor devices, and to provide such devices.

The method of the present invention comprises the polymerization of water hydrolyzable organo-substituted silanes, including a monofunctional organosilane, into a silicone protective film on the surface of the semiconductor body after the semiconductor body has been etched by methods well known to the art.

The novel features which are believed to be characteristic of the invention, both as to its organization and method of operation, together with further objects and advantages thereof, will be better understood from the following description in which a presently-preferred embodiment of the invention is described by way of example.

In accordance with an illustrative embodiment of the present invention, a silicon crystal body which has been cut and lapped to the desired dimensions and including a region within the body of opposite conductivity type than that of the body and separated from the body by a rectifying P–N junction is etched by methods well known to the art. For example, in the presently-preferred embodiment, the etching step is carried out by imersing the silicon body for approximately 30 seconds in a solution containing equal parts of nitric acid, hydrofluoric acid and acetic acid. The silicon body is then rinsed in distilled water, boiled in a 50/50 mixture of acetone and methyl alcohol, and rinsed in absolute methyl alcohol.

After etching as described above, the surfaces of the crystal body are moistened by immersing the body in water and then drying with filter paper to remove excess water. Since the reaction between water and organo-substituted silanes causes polymerization of the silane, more uniform results are obtained in surface treatment when moisture is present on the surface. Visible condensed water, however, must be removed since its presence causes the formation of thick non-uniform patches of the surface coating which is applied as described hereinafter.

A solution of water hydrolyzable organo-substituted silanes is then applied to all surfaces of the silicon body. In this embodiment this is accomplished by immersing the silicon body in the organo-substituted silanes liquid. The silicon body is left in the liquid for a sufficient length of time to cause complete wetting of all surfaces. For example, one minute is an illustrative length of time. For the most uniform results, the liquid silane is agitated to cause complete wetting of the silicon surfaces by the silane. Excellent results have been achieved by using ultrasonic agitation. In the presently-preferred embodiment, a mixture of organo-substituted chlorosilane is used which is a mixture containing one part of methyltrichlorosilane, one part dimethyldichlorosilane and two parts of trimethylchlorosilane. The use of this mixture as the water hydrolyzable organo chloro-substituted silane liquid furnishes space polymerization and maximum bonding of silicone molecules to the silicon surface, as well as stability. The reaction of the dimethyldichlorosilane, methyltrichlorosilane and trimethylchlorosilane with moisture which is adsorbed on the surface of the silicon body causes hydrochloric acid to be split off and a polymerization chain to form which leaves a thin protective film of silicone polymers which adheres to the silicon surface.

When only dimethyldichlorosilane and methyltrichlorosilane are utilized as the solution for treating the semiconductor body, as disclosed in the application of Schwartz, supra, and the hydrochloric acid splits off during the reaction, there exists polymer chains of uncontrolled length and in some instances polymer ends, the disposition of which is not known. These factors in some instances caused a degrading of the electrical characteristics of the device over a long period of time. By use of a monofunctional organo-substituted silane in accordance with the present invention, the reaction between the molecules of the silanes and the water is stopped at the point where the monofunctional silane joins a molecule of the other silanes present. This stopping of the polymerization chain results because there is only one reactive group in the monofunctional silane. Therefore, the monofunctional silane group acts as a chain stopper to the polymerization, thus controlling the length of the polymer chain and making the disposition of the polymer ends more predictable. The result is a chemically very stable, protective film on the semiconductor body which improves the electrical characteristics and prevents a degrading thereof over long periods of time.

The mixture of dimethyldichlorosilane, methyltrichlorosilane, and trimethylchlorosilane results in excellent surface treatment of the silicon crystal since the methyltrichlorosilane furnishes a spatial three-dimensional polymerization for good bonding and complete coverage of the silicon surface, the dimethyldichlorosilane and trimethylchlorosilane supply a maximum number of organic methyl groups which provide the good protective film, and the trimethylchlorosilane as well provides the chain stopper action. In addition, the chemical bond between silicon atoms and oxygen atoms in the silicone polymer is strong, resulting in good thermal stability of the film.

It will be apparent to one skilled in the art that although a 1–1–2 mixture of dimethyldichlorosilane, methyltrichlorosilane, and trimethylchlorosilane, respectively, has been described in the illustrative embodiment, the proportion of the three compounds in the organo-substituted silane liquid is not critical. It does, however, appear that one limitation should be imposed upon the mixture used; that is, if 100% trimethylchlorosilane is used, the alpha (the current amplification factor) of the transistor is increased substantially, but $I_{co}$ (direct-current collector current for zero emitter current) acts in the way normally expected if the body is not treated, namely, it increases with time. Therefore, to obtain overall optimum electrical characteristics, a 100% trimethylchlorosilane solution should not be used.

The thickness of the protective film which is formed on the silicon surface is very thin, being of the order of approximately $6\times10^{-5}$ centimeters. For some applications, a film of less thickness may be allowable, or in some instances may be necessary. In such a case the thickness of the film may be decreased by diluting the silane liquid with as much as 90 percent of an organic solvent such as trichloroethylene.

After complete wetting of all surfaces of the silicon crystal has been achieved, the silicon crystal is removed from the water hydrolyzable organo-substituted silane liquid and baked to drive off all volatile materials, complete the polymerization of the silane, thus resulting in a strengthening of the bond between the silicone polymer and the surface of the silicon crystal. In the presently-preferred embodiment, for example, baking for approximately two hours at 100° C. or one hour at 300° C. accomplishes these results.

Although the present invention has been described with particular reference to the surface treatment of silicon crystals, germanium crystals and alloys of silicon and germanium may also be treated in accordance with this invention to obtain a protective coating and improved electrical characteristics.

Although methyltrichlorosilane, dimethyldichlorosilane, and trimethylchlorosilane have been described as the presently-preferred silane liquid, other water hydrolyzable organo-substituted silanes, such as diethyldichlorosilane, phenyltrichlorosilane and trimethylethoxysilane, may be used.

In obtaining the thermally stable protective film upon the semiconductor crystal body, the surface treatment described herein yields improved electrical characteristics in semiconductor devices which are constructed by utilizing semiconductor crystal bodies which have been so treated. It has been found that when a semiconductor crystal body, such as silicon, having a P–N junction formed therein, is etched and exposed to ambient conditions, such as atmosphere and temperature, an effect known as the "channel effect" is encountered which produces poorly-defined P–N junctions. This effect is caused by a surface conductivity layer of P-type along the N-type region, or vice versa. Although the theory behind the "channel effect" in P–N junctions is not too clearly understood, it has been found that the surface treatment described herein eliminates such an effect and thereby maintains a clearly-defined P–N junction within the semiconductor body. Semiconductor devices utilizing semiconductor bodies treated in accordance with the present invention have improved saturation current characteristics. Further, when transistors are treated it is found that alpha remains at least constant for a long period of time and $I_{co}$ decreases. The results of tests performed on illustrative samples are included in Table I below for purposes of example only to demonstrate results of the surface treatment of the present invention. The devices tested were silicon P–N–P fused junction transistors. The control unit was treated exactly as the test units, except for the protective coating, while the test units were also treated with the hereinabove referred to 1–1–2 preferred solution. Alpha was measured with a 5 volt bias on the collector and 1 milliampere of current flowing through the emitter. $I_{co}$ was measured as follows: value A at −5 volts, and value B at −25 volts on the collector.

| | Unit | Alpha | $I_{co}$ millimicroamperes | | R Megohms |
|---|---|---|---|---|---|
| | | | A | B | |
| Before Treatments | Control | 0.816 | 12,000 | 17,000 | > 1 |
| | 1 | 0.825 | 4,000 | 4,000 | >10 |
| | 2 | 0.911 | 36,000 | 60,000 | .5 |
| | 3 | 0.908 | 82,000 | 140,000 | >100 |
| | 4 | 0.804 | 14,000 | 17,000 | >1 |
| After Treatments | Control | 0.846 | 2,000 | 2,000 | 10 |
| | 1 | 0.799 | 63 | 260 | >100 |
| | 2 | 0.842 | 30 | 200 | >100 |
| | 3 | 0.851 | 24 | 80 | >100 |
| | 4 | 0.822 | 24 | 30 | >100 |
| 2 Weeks After Treatment | Control | 0.811 | 3,400 | 3,800 | 10 |
| | 1 | 0.822 | 58 | 140 | >100 |
| | 2 | 0.874 | 150 | 240 | 33 |
| | 3 | 0.887 | 66 | 85 | >100 |
| | 4 | 0.839 | 63 | 70 | >100 |

R is the dynamic resistance of the transistor looking into the collector electrode.

It will be seen from the above table that alpha of the treated units increased slightly with time, while alpha of the control units decreases with time. Furthermore, $I_{co}$ of the treated units has been substantially reduced by the treatment and remains relatively stable with time thereafter, while the dynamic resistance R of the unit is substantially increased. It is, therefore, seen that good stability is obtained as well as enhanced electrical characteristics through treatment of a transistor in accordance with the present invention.

Although the silane film is applied to the semiconductor body by immersion of the body in the silanes liquid in this illustrative embodiment, it may also be applied by entraining the silane in vapor form and causing the entrained vapor to be passed over the surfaces of the semiconductor body.

Thus, the present invention provides a method for the surface treatment of semiconductor crystal bodies and improved semiconductor devices. The treatment results in the formation of a stable protective film upon the crystal bodies, together with improved electrical characteristics of the semiconductor body, without subjecting the body to damaging temperatures or ambient conditions.

What is claimed is:

1. The method of surface treatment of a semiconductor crystal body containing moisture for use in a semiconductor signal translating device which comprises the steps of etching a surface of said semiconductor crystal body, moistening said surface, immersing said surface in a solution of water hydrolyzable organo-substituted silanes including a monofunctional organo silane, removing said silicon body from said solution, and heating said body to a predetermined temperature sufficient to boil off the volatile compounds which remain after the polymerization of the organo-substituted silanes.

2. The method of surface treatment of a silicon body for use in a semiconductor signal translating device which comprises the steps of etching said surface of said silicon body, moistening said surface, immersing said surface in a solution of water hydrolyzable organo-substituted chlorosilane including a monofunctional chlorosilane, removing said silicon body from said solution, and heating said body to a predetermined temperature sufficient to boil off the volatile compounds which remain after the polymerization of the organo-substituted chlorosilane.

3. The method of surface treatment of a semiconductor body for use in a semiconductor signal translating device which comprises the steps of etching a surface of said semiconductor body, moistening said surface of said semiconductor body, immersing said surface in a mixture comprising dimethyldichlorosilane, methyltrichlorosilane, and trimethylchlorosilane, removing said semiconductor body from said mixture, and baking said semiconductor body to remove volatile compounds from said surface after the polymerization of said dimethyldichlorosilane, methyltrichlorosilane, and trimethylchlorosilane.

4. The method of surface treatment of a silicon body for use in a semiconductor signal translating device which comprises etching a surface of said silicon body, moistening said surface of said silicon body, immersing said surface in a mixture comprising dimethyldichlorosilane, methyltrichlorosilane, and trimethylchlorosilane, removing said silicon body from said mixture, and baking said silicon body to remove volatile compounds from said surface after the polymerization of said dimethyldichlorosilane, methyltrichlorosilane, and trimethylchlorosilane.

5. The method of surface treatment of a silicon body for use in a semiconductor signal translating device comprising etching said silicon body, immersing said silicon body in water, removing said silicon body from said water, drying said surfaces to remove excess water therefrom, immersing said silicon body in a solution comprising from approximately 1 percent to 99 percent of trimethylchlorosilane, the remainder containing from approximately zero to 99 percent of dimethyldichlorosilane and from approximately zero to 99 percent methyltrichlorosilane, removing said silicon body from said solution, and baking said silicon body to remove volatile compounds from said surface after the polymerization of said dimethyldichlorosilane, methyltrichlorosilane, and trimethylchlorosilane.

6. The method of surface treatment of a silicon body for use in a semiconductor signal translating device comprising etching the surfaces of said silicon body, immersing said silicon body in water, removing said silicon body from said water, drying said surfaces to remove excess water therefrom, immersing said silicon body in a solution comprising approximately one part of dichlorodimethylsilane, one part methyltrichlorosilane, and two parts of trimethylchlorosilane, removing said silicon body from said solution, and baking said silicon body to remove volatile compounds from said surface after the polymerization of said dimethyldichlorosilane, methyltrichlorosilane, and trimethylchlorosilane.

7. In a semiconductor translating device, the combination comprising: a semiconductor body of one conductivity type; a region within said body of the opposite conductivity type and separated from said body by a rectifying junction; and a coating upon at least one surface of said body, said coating comprising a hydrolyzed organo-substituted silane including a monofunctional silane.

8. In a semiconductor translating device, the combination comprising: a semiconductor body of one conductivity type, a region within said body of the opposite conductivity type and separated from said body by a rectifying junction. and a coating upon at least one surface of said body, said coating comprising a hydrolyzed organo-substituted chlorosilane including a monofunctional chlorosilane.

9. In a semiconductor translating device, the combination comprising: a semiconductor body of one conductivity type; a region within said body of the opposite conductivity type and separated from said body by a rectifying junction; and a coating upon at least one surface of said body, said coating comprising a hydrolyzed polymerized dimethyldichlorosilane-methyltrichlorosilane-trimethylchlorosilane solution.

10. In a semiconductor translating device, the combination comprising: a semiconductor body of one conductivity type; a region within said body of the opposite conductivity type and separated from said body by a rectifying junction; and a coating upon at least one surface of said body, said coating comprising a heat treated polymerized dimethyldichlorosilane-methyltrichlorosilane-trimethylchlorosilane solution.

References Cited in the file of this patent

UNITED STATES PATENTS

| | | |
|---|---|---|
| 2,306,222 | Patnode | Dec. 22, 1942 |
| 2,408,822 | Tanis | Oct. 8, 1946 |
| 2,743,201 | Johnson et al. | Apr. 24, 1956 |

FOREIGN PATENTS

| | | |
|---|---|---|
| 157,562 | Australia | July 8, 1954 |